UNITED STATES PATENT OFFICE.

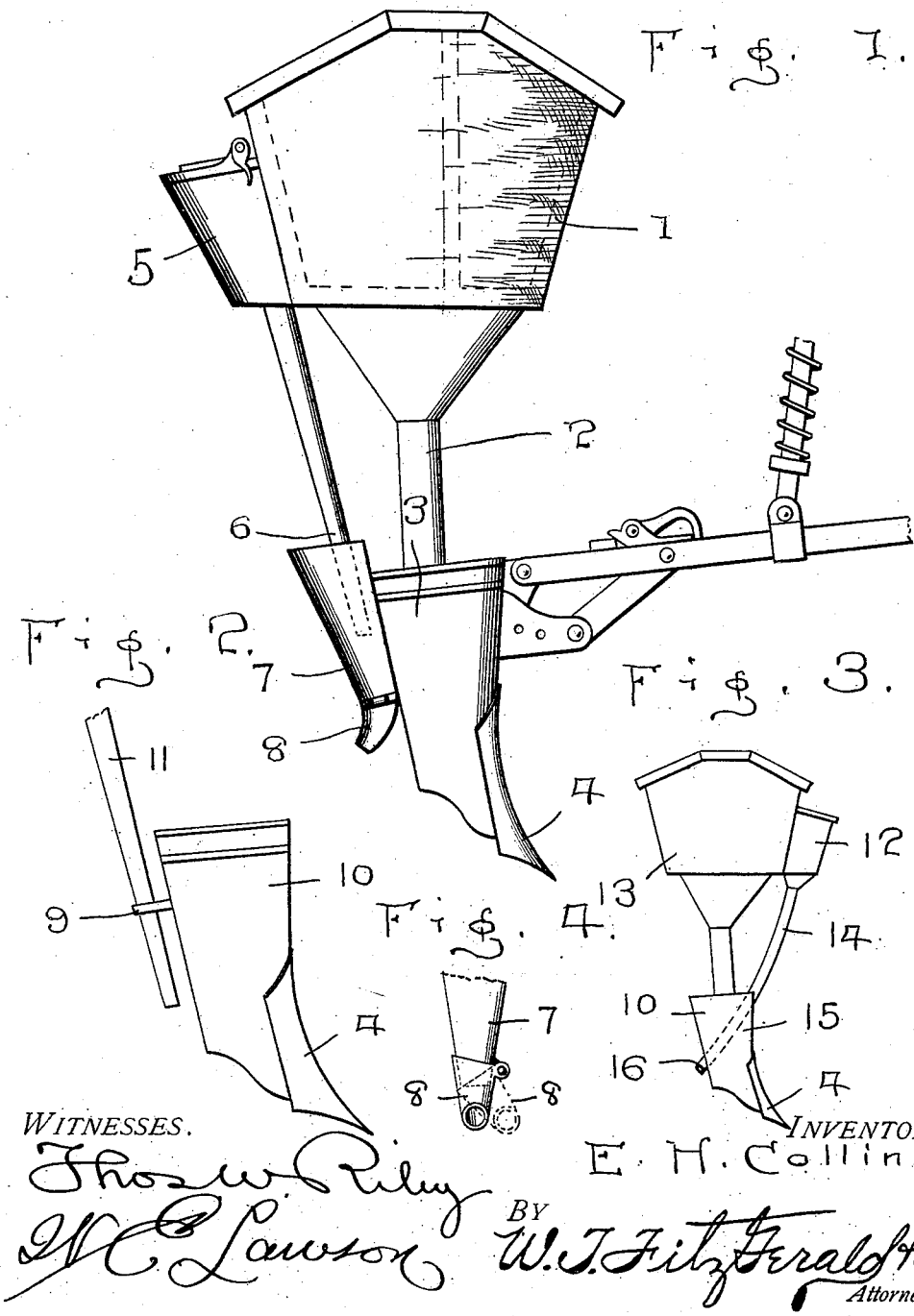

EDWARD H. COLLINS, OF ORLEANS, INDIANA.

GRAIN-DRILL.

No. 904,410.  Specification of Letters Patent.  Patented Nov. 17, 1908.

Application filed July 7, 1908. Serial No. 442,409.

*To all whom it may concern:*

Be it known that I, EDWARD H. COLLINS, a citizen of the United States, residing at Orleans, in the county of Orange and State of Indiana, have invented certain new and useful Improvements in Grain-Drills; and I do hereby declare the following to be a full, clear, and exact description of the invention, such as will enable others skilled in the art to which it appertains to make and use the same.

This invention relates to new and useful improvements in grain drills and it is an object of the invention to provide a novel device in addition to one intended more especially for the planting of wheat, said device including a means whereby grass and clover seed may be planted in conjunction with the wheat without being sown broadcast or passing through the wheat shoe.

It is also an object of the invention to provide a novel device of this character wherein the grass or clover seed is deposited in the drill mark or furrow behind the shoe and at a less depth than the wheat or at any depth desired and wherein said grass or clover seed is prevented from being scattered broadcast.

It is also an object of the invention to provide a novel device of this character wherein the grass or clover seed can be deposited at different points back of the wheat shoe, said adjustment being permitted by a pivoted finger or conductor carried by the auxiliary shoe for the grass or clover seed or by an adjustable ring attached to the back of the original shoe.

It is also an object of the invention to provide a novel device of this character which is employed to deposit by any means whatever the grass seed in the drill mark behind the shoe at any depth desired in contrast to the common practice of either broadcasting or running the grass seed through the shoe with the seed wheat.

With the above and other objects in view, the invention consists of the details of construction and in the novel arrangement and combination of parts to be hereinafter more particularly referred to.

In describing the invention in detail, reference will be had to the accompanying drawings forming part of this specification wherein like characters of reference denote corresponding parts in the several views, and in which, Figure 1. is a view in side elevation of a grain drill with one form of the invention applied thereto. Fig. 2 is a fragmentary view in side elevation illustrating a second form of invention, Fig. 3 is a view in side elevation illustrating a still further form of invention, and Fig. 4 is an edge elevation of the auxiliary shoe and the pivoted finger or conductor attached thereto.

In the drawings, 1 denotes a hopper of any ordinary or preferred construction in communication through the pipe or tube 2 with the shoe 3 having a point or plow 4. This arrangement is old and forms no part of the present invention, it being understood that any other form may be substituted for the one herein mentioned and shown in the accompanying drawings. The hopper 1 is intended to contain the seed wheat which is discharged through the shoe 3 into the furrows formed by the plow 4.

To the rear of the hopper 1 is secured an auxiliary hopper 5 which contains the grass and clover seed and this seed is discharged through a pipe or tube 6 to a small shoe 7 suitably secured to the rear of the shoe 3 before referred to. The lower end of the shoe 7 has pivoted thereto a finger or conductor 8 and it is the various positions assumed by this finger or conductor 8 that determines the point of discharge of the grass and clover seed with relation to the shoe 3. It is to be observed that the finger or conductor 8 terminates at a point above the open end of the shoe 3. By this arrangement it is assured that the grass and clover seed will be deposited within the furrows formed by the point or plow 4 at any depth desired above the deposit of the wheat grains.

The device herein contained is very simple as the small shoe may be conveniently secured to any well known form of grain drill, while the auxiliary hopper 5 can be conveniently secured to any other hopper, as is believed to be apparent.

In Fig. 2 is illustrated a form of invention wherein in lieu of the small shoe 7, a ring 9 is formed on the rear of the shoe 10 through which the auxiliary tube 11 passes.

In Fig. 3 is shown a form of invention wherein the auxiliary hopper 12 is secured to the forward face of the main hopper 13 and the auxiliary hopper 12 has in communication therewith the flexible tube 14 which passes around the shoe 15 and terminates as at 16 to the rear thereof depositing the grass seed in the drill mark behind the shoe 15.

It has been found in the successful operation of the device that the speed of the feed shaft should be carefully watched. If the shaft should run very slow the seed would overflow and then arch itself sufficiently to restrict or stop the flowing for a moment or two and then break down and flow freely a while. With a faster feed it would flow in a constant stream. It is to be added therefore, that provision may be made whereby the speed of the grass seed feed may increase to meet the necessities of like seeding which is essential in this manner of seed grass.

I claim:

In combination with a hopper and a shoe in communication therewith; of an auxiliary shoe secured to the rear of the first-named shoe and having its lower end terminating above the lower end of the first named shoe; a hopper carried by the first named hopper in communication with the second named shoe and a pivoted finger or conductor attached to the second named shoe to vibrate or oscillate.

In testimony whereof I have signed my name to this specification in the presence of two subscribing witnesses.

EDWARD H. COLLINS.

Witnesses:
I. C. WALTHERS,
GEO. H. CURTIS.